(12) United States Patent
Lee et al.

(10) Patent No.: US 9,835,924 B1
(45) Date of Patent: Dec. 5, 2017

(54) SILICON BASED TERAHERTZ FULL WAVE LIQUID CRYSTAL PHASE SHIFTER

(71) Applicant: National Sun Yat-sen University, Kaohsiung (TW)

(72) Inventors: Chao-Kuei Lee, Kaohsiung (TW); Han-Wei Zhang, Kaohsiung (TW); Tsung-Hsien Lin, Kaohsiung (TW); Chun-Ta Wang, Kaohsiung (TW); Jun-Ting Guo, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 15/394,114

(22) Filed: Dec. 29, 2016

(30) Foreign Application Priority Data

Oct. 11, 2016  (TW) .............................. 105132770 A

(51) Int. Cl.
*G02F 1/1341* (2006.01)
*G02F 1/139* (2006.01)
*G02F 1/1337* (2006.01)
*G02F 1/1333* (2006.01)

(52) U.S. Cl.
CPC .......... *G02F 1/1393* (2013.01); *G02F 1/1337* (2013.01); *G02F 1/133305* (2013.01); *G02F 2001/133738* (2013.01); *G02F 2202/105* (2013.01); *G02F 2202/16* (2013.01); *G02F 2203/13* (2013.01)

(58) Field of Classification Search
CPC ......... H01L 1/107; H01L 1/02; G02F 1/0316; G02F 1/1341; G02F 1/05; G02F 1/1337; G02F 1/1393; G02F 1/133305
See application file for complete search history.

(56) References Cited

U.S. PATENT DOCUMENTS

| | | | | |
|---|---|---|---|---|
| 2009/0002581 | A1* | 1/2009 | Chao .................. | G02F 1/13768 349/23 |
| 2009/0262766 | A1* | 10/2009 | Chen ..................... | H03C 7/027 372/26 |
| 2010/0258727 | A1* | 10/2010 | Itsuji .................. | G01N 21/3581 250/338.4 |
| 2013/0050602 | A1* | 2/2013 | MacPherson ..... | G02F 1/134363 349/41 |

(Continued)

OTHER PUBLICATIONS

Guo et al., "Silicon Based Ohmic Contact THz Liquid Crystal Phase Shifter", 34th Symposium of Spectroscopic Technologies and Surface Science, Jul. 18-20, 2016, 8 pages.

(Continued)

*Primary Examiner* — Timothy L Rude
(74) *Attorney, Agent, or Firm* — Muncy, Geissler, Olds & Lowe, P.C.

(57) ABSTRACT

A silicon based terahertz full wave liquid crystal phase shifter is provided. The liquid crystal phase shifter has a first silicon conductive substrate, a second silicon conductive substrate, a plurality of pads, and a liquid crystal. The first and second silicon conductive substrates, instead of the quartz glass and transparent electrode, such as ITO, are used as substrates and to provide electrodes of the liquid crystal phase shifter. Thus, the effect of the liquid crystal phase modulation of the liquid crystal phase shifter in the THz range can be improved.

10 Claims, 2 Drawing Sheets

(56) References Cited

U.S. PATENT DOCUMENTS

2015/0253627 A1* 9/2015 Pan .................. G02F 1/133707
349/123
2016/0202505 A1* 7/2016 Wu ........................ G02F 1/061
349/139

OTHER PUBLICATIONS

Han-Wei Zhang, "ITO Free Silicon Based THz Liquid Crystal Phase Shifter", Department of Photonics National Sun Yat-Sen University Kaohsiung, Jul. 2016, 79 pages.

* cited by examiner

SILICON BASED TERAHERTZ FULL WAVE LIQUID CRYSTAL PHASE SHIFTER

CROSS REFERENCE TO RELATED APPLICATIONS

This application claims the priority benefit of Taiwan Patent Application No. 105132770, filed on Oct. 11, 2016. This invention is partly disclosed in theses entitled "ITO free Silicon Based THz Liquid Crystal Phase Shifter" on July, 2016 completed by Han-Wei Zhang and Dr. Yuan-Yao Lin, and "Silicon Based Ohmic Contact THz Liquid Crystal Phase Shifter" on Jul. 18, 2016 completed by Jun-Ting Guo, Han-Wei Zhang, Chun-Ta Wang, Tsung-Hsien Lin and Chao-Kuei Lee. The contents of which are herein incorporated by reference.

FIELD OF THE INVENTION

The present invention relates to a liquid crystal phase shifter, and more particularly to a silicon based terahertz full wave liquid crystal phase shifter.

BACKGROUND OF THE INVENTION

Recently, a variety of terahertz range modulation components have been studied and invented with the development of the terahertz range. In past studies, the phase shifter was made of the nematic liquid crystal, which has large birefringence, and the direction of the nematic liquid crystal was changed by adjusting the electric field to change the refractive index as the phase modulation.

In more detail, the phase shifter is made of the nematic liquid crystal, the magnetic field or electric field is used to change the direction of the nematic liquid crystal resulting in a change of the refractive index. The substrates of the liquid crystal phase shifter are mostly made of quartz glass, wherein the quartz has an effect of being highly transparent in the visible light frequency range and the terahertz frequency range. The electrodes need be disposed and have a voltage applied to achieve the birefringence by changing the refractive index of the liquid crystal. The most common method is that a transparent conductive electrode, such as indium tin oxide (ITO) thin film, is plated on the quartz glass to be the electrodes because the quartz glass is not conductive.

However, ITO thin film is transparent in the visible light frequency range, but has a high absorption in the terahertz frequency range and cannot be transparent. Thus, ITO thin film is a material with low transparency and high absorption in the terahertz frequency range, and the effect of the liquid crystal phase modulation of the liquid crystal phase shifter is poor.

As a result, it is necessary to provide a silicon based terahertz full wave liquid crystal phase shifter to solve the problems existing in the conventional technologies, as described above.

SUMMARY OF THE INVENTION

An object of the present invention is to provide a silicon based terahertz full wave liquid crystal phase shifter which adopts silicon conductive substrates to instead of the quartz glass and transparent electrode, such as ITO, as substrates of the liquid crystal phase shifter to provide electrodes of the liquid crystal phase shifter. Thus, the effect of the liquid crystal phase modulation of the liquid crystal phase shifter in the THz range can be improved.

To achieve the above object, the present invention provides a silicon based terahertz full wave liquid crystal phase shifter, which comprises a first silicon conductive substrate, a second silicon conductive substrate, a plurality of pads, and a liquid crystal; wherein the first silicon conductive substrate includes a first inner surface and a first outer surface opposite to the first inner surface, the first inner surface includes a first cell portion and a first conductive portion located at a side of the first cell portion; the second silicon conductive substrate includes a second inner surface facing the first inner surface and a second outer surface opposite to the second inner surface, the second inner surface includes a second cell portion and a second conductive located at a side of the second cell portion; the pads are stacked between the first cell portion and the second cell portion to form a space; the liquid crystal is filled in the space.

In one embodiment of the present invention, each of the first silicon conductive substrate and the second silicon conductive substrate is made of a P-type semiconductor.

In one embodiment of the present invention, each of the first silicon conductive substrate and the second silicon conductive substrate is made of an N-type semiconductor.

In one embodiment of the present invention, the liquid crystal phase shifter includes a first horizontal alignment film coated on the first cell portion of the first inner surface.

In one embodiment of the present invention, the liquid crystal phase shifter includes a second horizontal alignment film coated on the second cell portion of the second inner surface.

In one embodiment of the present invention, a thickness of the space from the first silicon conductive substrate to the second silicon conductive substrate is 2 mm to 2.2 mm.

In one embodiment of the present invention, the silicon based terahertz full wave liquid crystal phase shifter further comprises a first contacting film plated on the first conductive portion of the first inner surface.

In one embodiment of the present invention, the first contacting film is made of chromium, aluminum, titanium silicide, titanium nitride, tungsten, molybdenum silicide, platinum silicide, cobalt silicide, or tungsten silicide.

In one embodiment of the present invention, the liquid crystal phase shifter includes a second contacting film plated on the second conductive portion of the second inner surface.

In one embodiment of the present invention, the second contacting film is made of chromium, aluminum, titanium silicide, titanium nitride, tungsten, molybdenum silicide, platinum silicide, cobalt silicide, or tungsten silicide.

As described above, when the phase shift is modulated in the terahertz frequency range by using the nematic liquid crystal, the characteristic of highly transparency and low absorption appear in terahertz frequency range by disposing the first silicon conductive substrate and the second silicon conductive substrate in the liquid crystal phase shifter of the present invention. The phase shift of the liquid crystal can be modulated over $2\pi$ in 1 THz frequency range by applying the applied voltage between the first silicon conductive substrate and the second silicon conductive substrate. When the first silicon conductive substrate and the second silicon conductive substrate have low voltage applied after the process of ohmic contact, the phase shift of the liquid crystal shows a trend of near linearity when low voltage is applied.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 1:
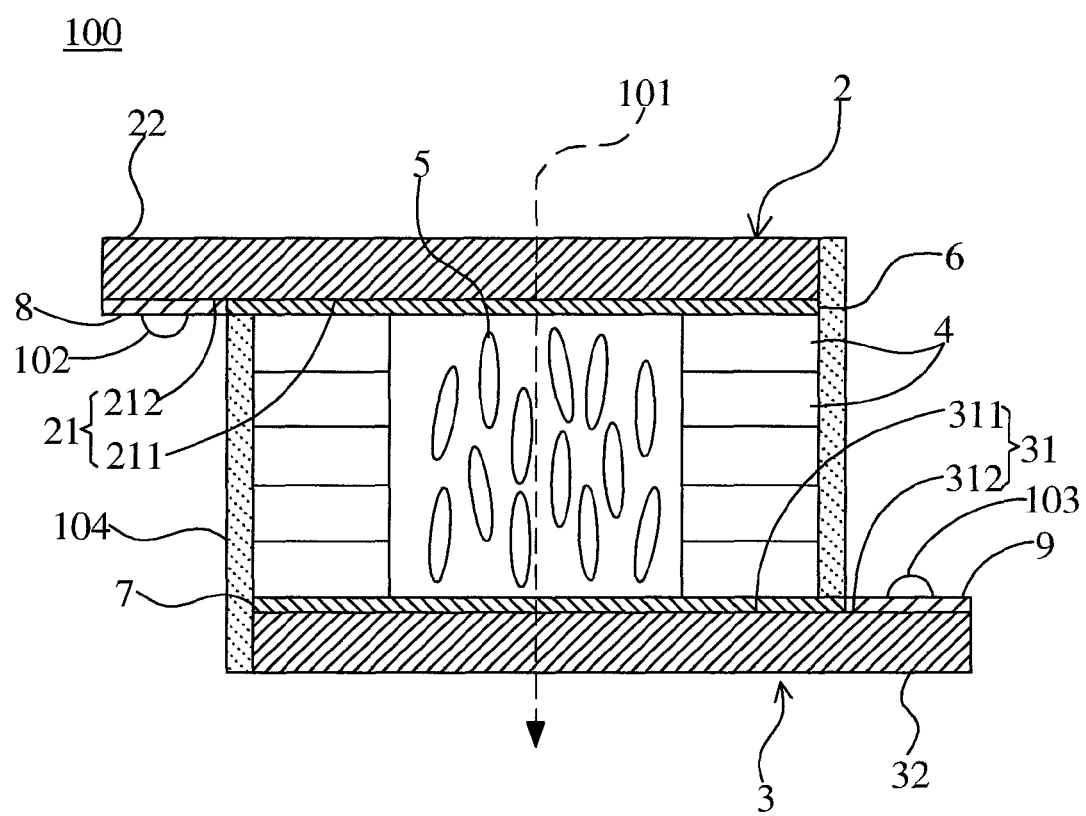
FIG. 1 is a schematic view of a silicon based terahertz full wave liquid crystal phase shifter according to a preferred embodiment of the present invention.

Referring to FIG. 1, a silicon based terahertz full wave liquid crystal phase shifter according to a preferred embodiment of the present invention is illustrated. As shown, the liquid crystal phase shifter 100 comprises a first silicon conductive substrate 2, a second silicon conductive substrate 3, a plurality of pads 4, a liquid crystal 5, a first horizontal alignment film 6, a second horizontal alignment film, a first contacting film 8, and a second contacting film 9, wherein a terahertz wave passes through the liquid crystal phase shifter 100 along a path 101. The detailed structure of each component, assembly relationships, and principles of operation in the present invention will be described in detail hereinafter.

Referring to FIG. 1, the first silicon conductive substrate 2 includes a first inner surface 21 and a first outer surface 22, the first outer surface 22 is opposite to the first inner surface 21, wherein the first inner surface 21 includes a first cell portion 211 and a first conductive portion 212, the first conductive portion 212 is located at a side of the first cell portion 211.

Referring to FIG. 1, the second silicon conductive substrate 3 includes a second inner surface 31 and a second outer surface 32, wherein the second inner surface 31 faces the first inner surface 21, and the second outer surface 32 is opposite to the second inner surface 31, and the second inner surface 31 includes a second cell portion 311 and a second conductive 312, the second conductive 312 is located at a side of the second cell portion 311.

In the embodiment of the present invention, each of the first silicon conductive substrate 2 and the second silicon conductive substrate 3 is made of a P-type semiconductor, and a semiconductor resistance of the P-type semiconductor is 1 to 10 (Ohm-cm). In other embodiments, each of the first silicon conductive substrate 2 and the second silicon conductive substrate 3 is also made of an N-type semiconductor, which is not limited from the embodiment of the present invention. In addition, each thickness of the first silicon conductive substrate 2 and the second silicon conductive substrate 3 is 0.53 mm, and an absorption coefficient of the first silicon conductive substrate 2 and the second silicon conductive substrate 3 are less than an absorption coefficient of an indium tin oxide (ITO) thin film in prior art, wherein the a thickness of the ITO thin film is 20 nm.

Referring to FIG. 1, the pads 4 are stacked between the first cell portion 211 and the second cell portion 311 to form a space, and an insulating colloid coats around the outside of the pads 4, wherein a thickness of the space from the first silicon conductive substrate 2 to the second silicon conductive substrate 3 is 2 mm to 2.2 mm. In the embodiment of the present invention, the thickness of the space preferably is 2.1 mm, and a sectional area of the space is 5 mm×5 mm, thus the delayed phase shift of the liquid crystal 5 can be achieved to $2\pi$.

Referring to FIG. 1, the liquid crystal 5 is filled in the space, wherein the liquid crystal 5 is a nematic liquid crystal in the embodiment of the present invention, which changes the arrangement of the liquid crystal 5 by applying an applied voltage between the first silicon conductive substrate 2 and the second silicon conductive substrate 3.

Referring to FIG. 1, the first horizontal alignment film 6 is coated on the first cell portion 211 of the first inner surface 21, and the second horizontal alignment film 9 is coated on the second cell portion 311 of the second inner surface 31, thus the liquid crystal 5 is horizontal arrangement along a direction between the first silicon conductive substrate 2 and the second silicon conductive substrate 3. In the embodiment of the present invention, the first horizontal alignment film 6 and the second horizontal alignment film 7 are polyimide (PI) alignment films.

Referring to FIG. 1, the first contacting film 8 is plated on the first conductive portion 212 of the first inner surface 21, and the second contacting film 9 is plated on the second conductive portion 312 of the second inner surface 31. In the embodiment of the present invention, each thickness of the first contacting film 8 and the second contacting film 9 is 100 nm, and the first contacting film 8 and the second contacting film 9 are made of chromium. In other embodiments, each thickness of the first contacting film 8 and the second contacting film 9 is less than 100 nm, and the first contacting film 8 and the second contacting film 9 are also made of aluminum, titanium silicide, titanium nitride, tungsten, molybdenum silicide, platinum silicide, cobalt silicide, or tungsten silicide, which is not limited from the embodiment of the present invention.

Figure 2:
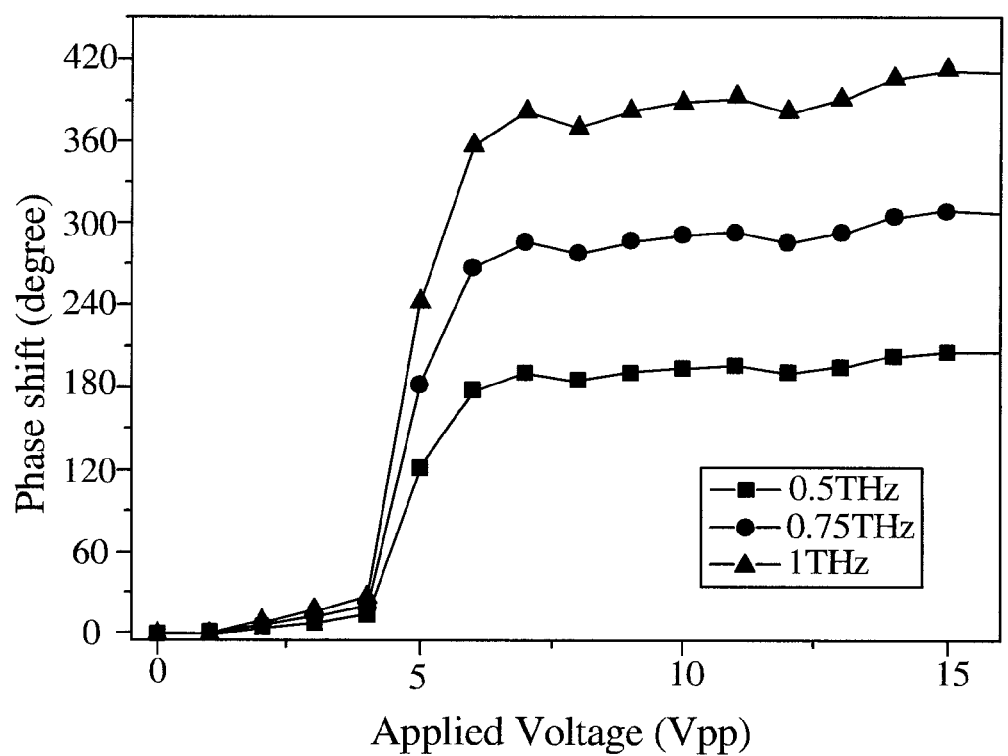
FIG. 2 illustrates the comparison of the measurement result of applied voltages and phase shifts at a different terahertz frequency according to a preferred embodiment of the present invention.

Referring to FIG. 2, an electrode 102 of the first silicon conductive substrate 2 and an electrode 103 of the second silicon conductive substrate 3 have a voltage applied, wherein the applied voltage is 0 V to 15 V. The phase shift of the liquid crystal 5 can be changed with a relative angle by changing the applied voltage. Furthermore, the first contacting film 8 formed on first conductive portion 212 and the second contacting film 9 formed on the second conductive portion 312 generate ohmic contacts respectively due to the first contacting film 8 and the second contacting film 9 being made of chromium. When the first silicon conductive substrate 2 and the second silicon conductive substrate 3 have the voltage applied, the phase shift of the liquid crystal 5 shows a trend of near linearity at low applied voltage after the process of ohmic contact in FIG. 2.

According to the described structure, the applied voltage is formed between the first silicon conductive substrate 2 and the second silicon conductive substrate 3 by applying voltage to the first conductive portion 212 and the second conductive portion 312 through the electrode 102 and the electrode 103 respectively. In addition, the liquid crystal 5 is arranged along a direction by disposing the first horizontal alignment film 6 and the second horizontal alignment film 7 and generating the terahertz wave passing through the first silicon conductive substrate 2 and the second silicon conductive substrate 3 along the path 101, so that the phase shift of the liquid crystal 5 can be modulated over 2π in 1 terahertz (THz) frequency range, and the phase shift of the liquid crystal 5 shows a trend of near linearity at low applied voltage.

As described above, when the phase shift is modulated in terahertz frequency range by using the nematic liquid crystal, the characteristic of the highly transparent and low absorption appear in the terahertz frequency range by disposing the first silicon conductive substrate 2 and the second silicon conductive substrate 3 in the liquid crystal phase shifter 100 of the present invention. The phase shift of the liquid crystal 5 can be modulated over 2π in 1 THz frequency range by applying the applied voltage between the first silicon conductive substrate 2 and the second silicon conductive substrate 3. Moreover, when the first silicon conductive substrate 2 and the second silicon conductive substrate 3 are applied the low applied voltage after the process of ohmic contact, the phase shift of the liquid crystal 5 shows a trend of near linearity at low applied voltage.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A silicon based terahertz full wave liquid crystal phase shifter, comprising:
   a first silicon conductive substrate including a first inner surface and a first outer surface opposite to the first inner surface, wherein the first inner surface includes a first cell portion and a first conductive portion located at a side of the first cell portion;
   a second silicon conductive substrate including a second inner surface facing the first inner surface and a second outer surface opposite to the second inner surface, wherein the second inner surface includes a second cell portion and a second conductive located at a side of the second cell portion;
   a plurality of pads stacked between the first cell portion and the second cell portion to form a space; and
   a liquid crystal filled in the space.

2. The silicon based terahertz full wave liquid crystal phase shifter according to claim 1, wherein each of the first silicon conductive substrate and the second silicon conductive substrate is made of a P-type semiconductor.

3. The silicon based terahertz full wave liquid crystal phase shifter according to claim 1, wherein each of the first silicon conductive substrate and the second silicon conductive substrate is made of an N-type semiconductor.

4. The silicon based terahertz full wave liquid crystal phase shifter according to claim 1, wherein the liquid crystal phase shifter includes a first horizontal alignment film coated on the first cell portion of the first inner surface.

5. The silicon based terahertz full wave liquid crystal phase shifter according to claim 1, wherein the liquid crystal phase shifter includes a second horizontal alignment film coated on the second cell portion of the second inner surface.

6. The silicon based terahertz full wave liquid crystal phase shifter according to claim 1, wherein a thickness of the space from the first silicon conductive substrate to the second silicon conductive substrate is 2 mm to 2.2 mm.

7. The silicon based terahertz full wave liquid crystal phase shifter according to claim 1, further comprising: a first contacting film plated on the first conductive portion of the first inner surface.

8. The silicon based terahertz full wave liquid crystal phase shifter according to claim 7, wherein the first contacting film is made of chromium, aluminum, titanium silicide, titanium nitride, tungsten, molybdenum silicide, platinum silicide, cobalt silicide, or tungsten silicide.

9. The silicon based terahertz full wave liquid crystal phase shifter according to claim 1, wherein the liquid crystal phase shifter includes a second contacting film plated on the second conductive portion of the second inner surface.

10. The silicon based terahertz full wave liquid crystal phase shifter according to claim 9, wherein the second contacting film is made of chromium, aluminum, titanium silicide, titanium nitride, tungsten, molybdenum silicide, platinum silicide, cobalt silicide, or tungsten silicide.

* * * * *